United States Patent
Zhang et al.

(10) Patent No.: US 8,563,146 B1
(45) Date of Patent: Oct. 22, 2013

(54) METHOD AND SYSTEM FOR PROVIDING A MAGNETIC RECORDING POLE HAVING A DUAL SIDEWALL ANGLE

(75) Inventors: Jinqiu Zhang, Fremont, CA (US); Ying Hong, Los Gatos, CA (US); Hai Sun, Milpitas, CA (US); Hongping Yuan, Fremont, CA (US); Guanghong Luo, Fremont, CA (US); Xiaoyu Yang, Union City, CA (US); Hongmei Han, Fremont, CA (US); Lingyun Miao, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 163 days.

(21) Appl. No.: 13/169,710

(22) Filed: Jun. 27, 2011

(51) Int. Cl.
*G11B 5/33* (2006.01)

(52) U.S. Cl.
USPC ............ 428/800; 428/810; 428/812; 428/815

(58) Field of Classification Search
None
See application file for complete search history.

(56) References Cited

U.S. PATENT DOCUMENTS

| | | | |
|---|---|---|---|
| 7,097,923 B2 * | 8/2006 | Webb et al. | 428/816 |
| 7,444,740 B1 | 11/2008 | Chung et al. | |
| 7,508,627 B1 | 3/2009 | Zhang et al. | |
| 7,552,523 B1 | 6/2009 | He et al. | |
| 7,633,712 B2 | 12/2009 | Chen et al. | |
| 8,196,285 B1 * | 6/2012 | Zhang et al. | 29/603.13 |
| 8,277,669 B1 * | 10/2012 | Chen et al. | 216/22 |
| 2008/0316644 A1 | 12/2008 | Lee et al. | |
| 2009/0294402 A1 | 12/2009 | Araki et al. | |
| 2010/0112486 A1 * | 5/2010 | Zhang et al. | 430/314 |

* cited by examiner

*Primary Examiner* — Duy Deo

(57) ABSTRACT

A method for fabricating a magnetic transducer having an air-bearing surface (ABS). An underlayer having a first and second regions and a bevel connecting these regions is provided. The first region is thicker and closer to the ABS than the second region. An intermediate layer conformal with the underlayer is provided. A hard mask layer having a top surface perpendicular to the ABS is formed on the intermediate layer. Part of the hard mask and intermediate layers are removed to provide a trench. The trench has a bottom surface and sidewalls having a first angle between the bottom surface and the intermediate layer and a second angle corresponding to the hard mask layer. A pole is provided in the trench. The pole has a pole tip, a yoke distal, and a bottom bevel. At least the yoke includes sidewalls having sidewall angles corresponding to the first and second angles.

18 Claims, 15 Drawing Sheets

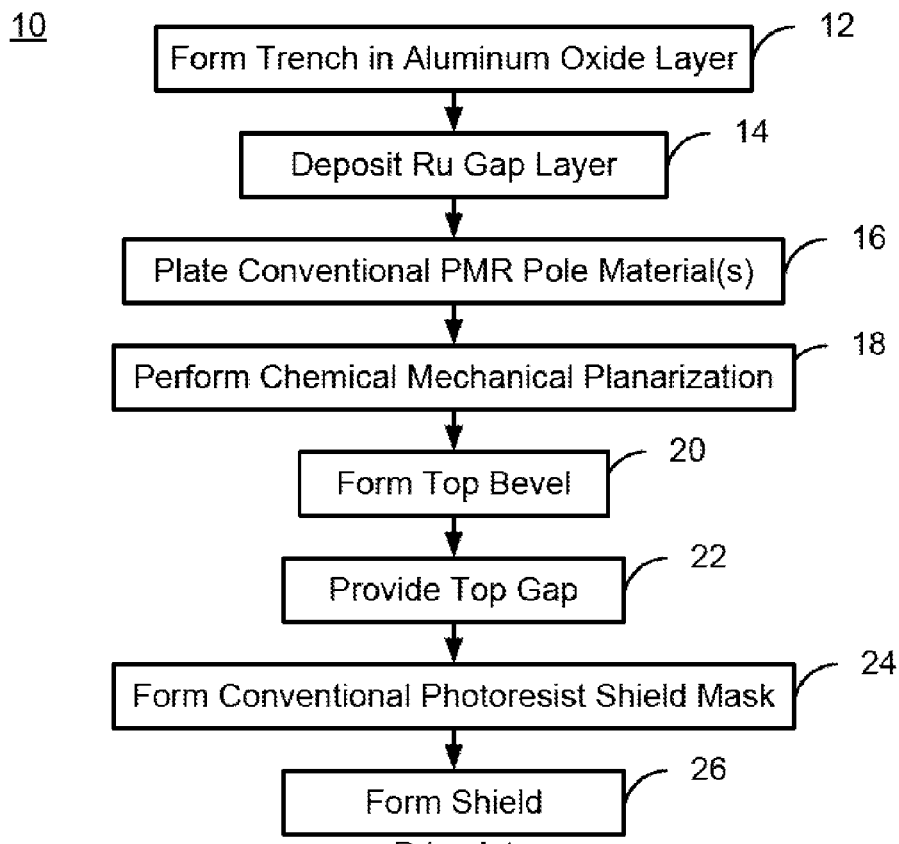
Prior Art
FIG. 1
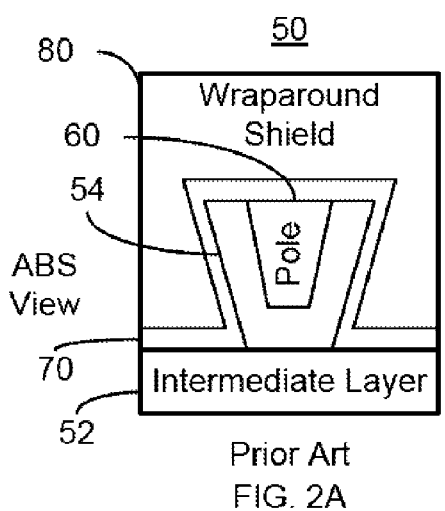
Prior Art
FIG. 2A
Prior Art
FIG. 2B

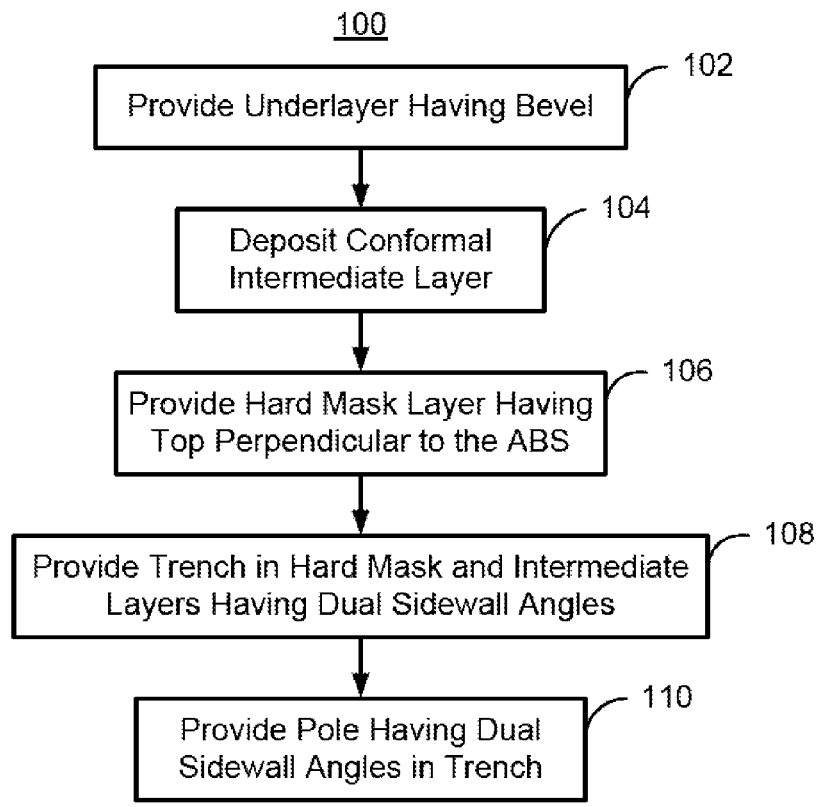
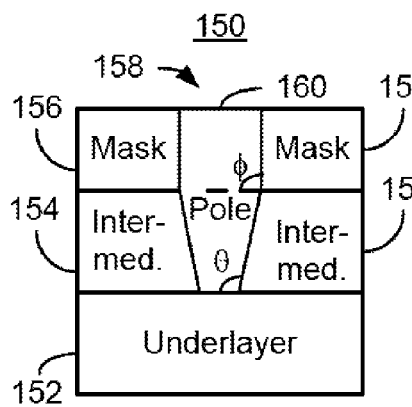 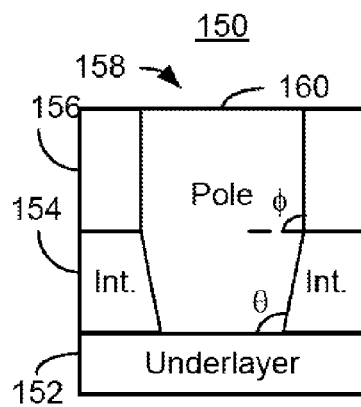 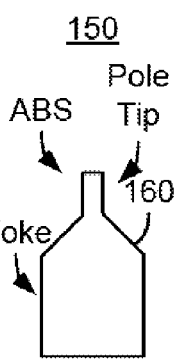

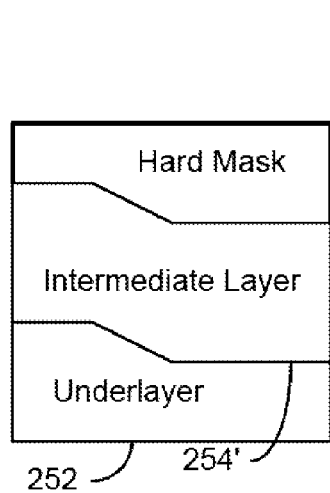 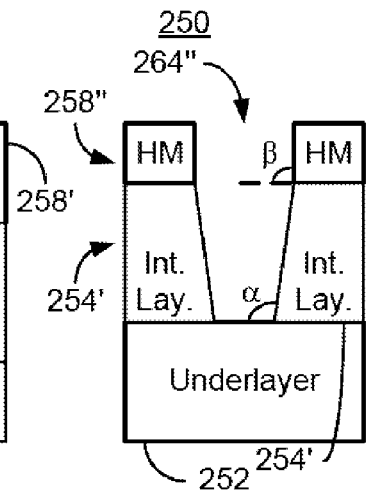 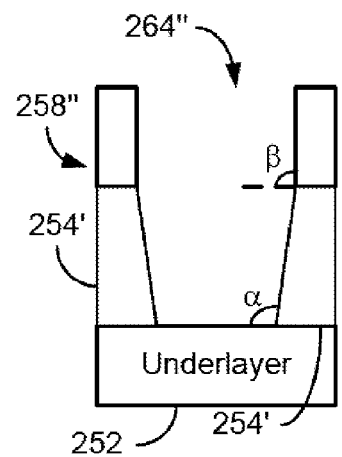
FIG. 14A     FIG. 14B     FIG. 14C
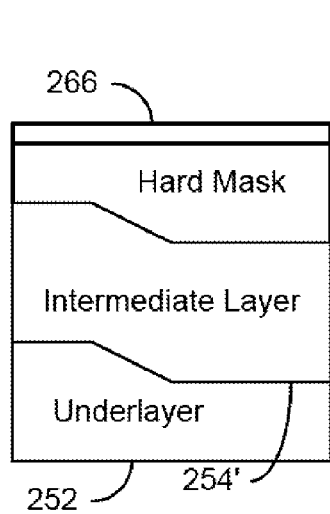 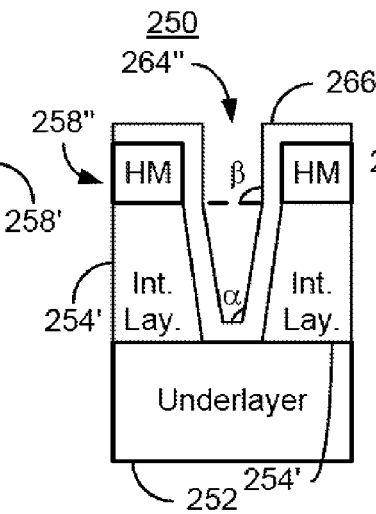 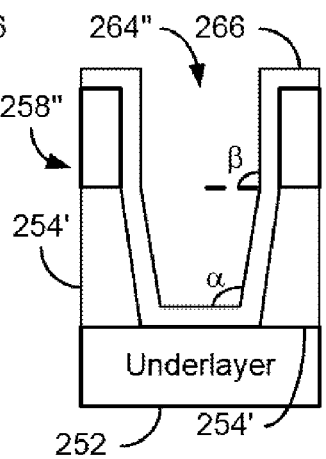
FIG. 15A     FIG. 15B     FIG. 15C

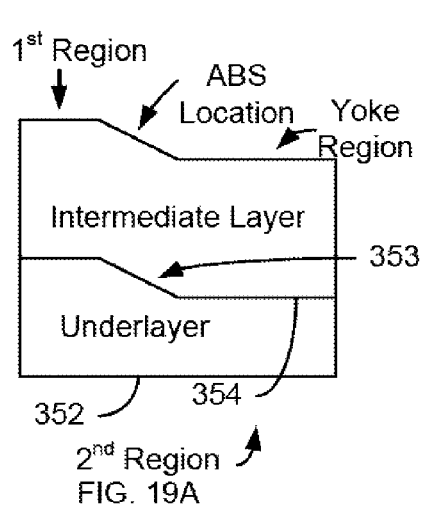
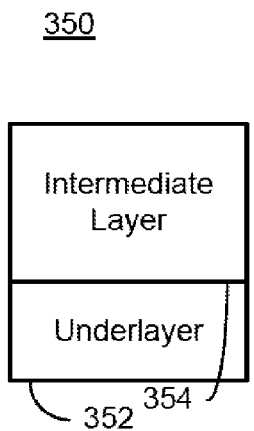
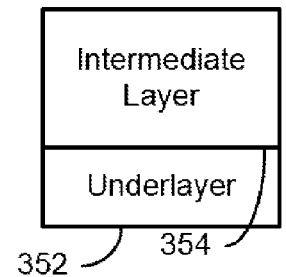
FIG. 19A
FIG. 19B
FIG. 19C
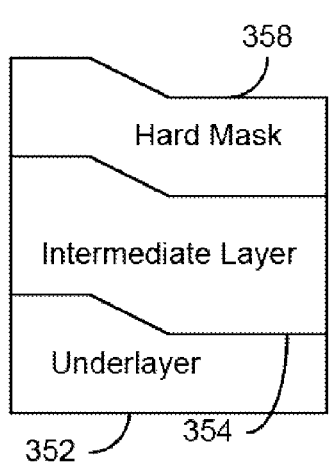
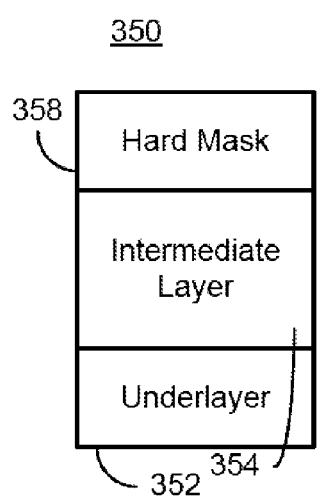
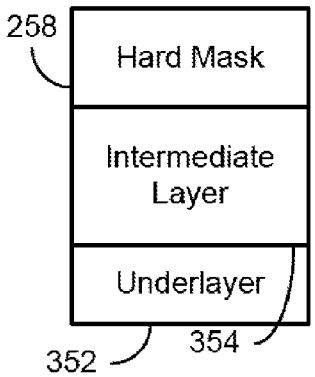
FIG. 20A
FIG. 20B
FIG. 20C

METHOD AND SYSTEM FOR PROVIDING A MAGNETIC RECORDING POLE HAVING A DUAL SIDEWALL ANGLE

BACKGROUND

FIG. 1 is a flow chart depicting a conventional method 10 for fabricating a conventional perpendicular magnetic recording (PMR) transducer. For simplicity, some steps are omitted. The conventional method 10 is used for providing a PMR pole in an aluminum oxide layer. A trench is formed in the aluminum oxide layer, via step 12. The top of the trench is wider than the trench bottom. As a result, the PMR pole formed therein will have its top surface wider than its bottom. Consequently, the sidewalls of the PMR pole will have a reverse angle. The bottom of the trench may also be sloped to provide a leading edge bevel. A Ru gap layer is deposited, via step 14. The Ru gap layer is used in forming a side gap. Step 14 typically includes depositing the Ru gap layer using chemical vapor deposition (CVD). The conventional PMR pole materials are plated, via step 16. Step 16 may include plating ferromagnetic pole materials as well as seed and/or other layer(s). A chemical mechanical planarization (CMP) may then be performed, via step 18, to remove excess pole material(s). A top, or trailing edge, bevel may then be formed, via step 20. The write gap is deposited, via steps 22. A conventional photoresist shield mask is formed using conventional photolithography, via step 24. A wraparound shield is then deposited, via step 26.

FIGS. 2A and 2B depict air-bearing surface (ABS) and yoke views, respectively, of a portion of a conventional PMR transducer 50 formed using the conventional method 10. FIGS. 2A and 2B are not to scale. The conventional transducer 50 includes an intermediate layer 52. The intermediate layer 52 is the layer in which the pole 60 is formed. The Ru gap layer 54 which is deposited in the trench (not shown) is also depicted. The conventional pole 60, write gap 70 and top shield 80 are also shown. The top shield 80 shown is a wraparound shield. Thus, using the conventional method 10, the pole 60 may be formed.

Although the conventional method 10 may provide the conventional PMR transducer 50, there may be drawbacks. For example, a higher write field may be desired at smaller track widths and device sizes. The conventional pole 60 may be unable to deliver a higher field at lower track widths. Accordingly, what is needed is an improved method for fabricating a PMR transducer.

SUMMARY OF THE INVENTION

A method for fabricating a magnetic transducer having an air-bearing surface (ABS). The method includes providing an underlayer having a first region, a second region, and a bevel connecting the first region and the second region. The first region has a first thickness and is proximate to the ABS. The second region has a second thickness less than the first thickness and is distal from the ABS. The method also includes depositing an intermediate layer that is substantially conformal with the underlayer and providing a hard mask layer on the intermediate layer. The hard mask layer has a top surface substantially perpendicular to the ABS. A portion of the hard mask layer and the intermediate layer are removed to provide a trench therein. The trench has a bottom surface and sidewalls having a first angle and a second angle. The first angle is between the bottom surface and the intermediate layer. The second angle corresponds to the hard mask layer. The method also includes providing a pole. At least a portion of the pole resides in the trench. The pole has a pole tip proximate to the ABS, a yoke distal from the ABS, and a bottom bevel corresponding to the bevel in the underlayer. At least the yoke includes a plurality of sidewalls having a plurality of sidewall angles corresponding to the first angle and the second angle

BRIEF DESCRIPTION OF SEVERAL VIEWS OF THE DRAWINGS

FIG. 1 is a flow chart depicting a conventional method for fabricating a PMR transducer.

FIGS. 2A and 2B are diagrams depicting ABS and yoke views of a conventional PMR transducer.

FIG. 3 is a flow chart depicting an exemplary embodiment of a method for fabricating a PMR transducer.

FIGS. 4A, 4B, and 4C are ABS and yoke views of an exemplary embodiment of a PMR transducer.

FIGS. 8A, 8B, and 8C-17A, 17B, and 17C are diagrams depicting an exemplary embodiment of a magnetic recording transducer during fabrication.

FIGS. 19A, 19B, and 19C-28A, 28B, and 28C are diagrams depicting another exemplary embodiment of a magnetic recording transducer during fabrication.

DETAILED DESCRIPTION OF THE PREFERRED EMBODIMENTS

Figure 5A:
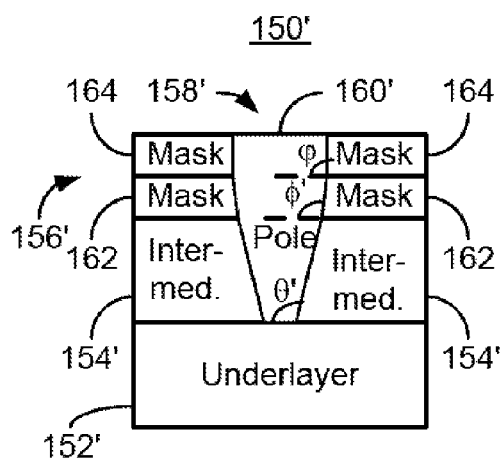
FIGS. 5A and 5B are ABS and yoke views of another exemplary embodiment of a PMR transducer.

FIG. 3 is a flow chart depicting an exemplary embodiment of a method 100 for fabricating a transducer. The method 100 is described in the context of a PMR transducer, though other transducers might be so fabricated. For simplicity, some steps may be omitted, interleaved, and/or combined. The PMR transducer being fabricated may be part of a merged head that also includes a read head (not shown) and resides on a slider (not shown) in a disk drive. The method 100 also may commence after formation of other portions of the PMR transducer. The method 100 is also described in the context of providing a single PMR pole and its associated structures in a single magnetic recording transducer. However, the method 100 may be used to fabricate multiple transducers at substantially the same time. The method 100 and system are also described in the context of particular layers. However, in some embodiments, such layers may include multiple sublayers. In one embodiment, the method 100 commences after formation of the layer(s) on which the PMR pole resides.

An underlayer having a first region, a second region, and a bevel connecting the first region and the second region is provided, via step 102. The first region is thicker than the second region and between the second region and the ABS. For example, the first region may be approximately 2600 Angstroms thick, while the second region may be approximately 1300 Angstroms thick. However, other thicknesses may be used. Further, a portion of the first region may occupy the ABS. The bevel is thus sloped at an angle greater than zero and less than ninety degrees from the ABS. Step 102 may include depositing the underlayer, masking a portion of the underlayer close to the ABS, and milling the exposed portion of the underlayer at a milling angle corresponding to the desired slope. However, in other embodiments, step 102 may be performed in another manner.

An intermediate layer is conformally deposited, via step 104. The intermediate layer is thus substantially conformal with the underlayer. Stated differently, the top surface of the intermediate layer has a topology that is substantially the same as the top surface of the underlayer. The thickness of the intermediate layer is thus the same above the first region, the bevel, and the second region of the underlayer. The intermediate is also nonmagnetic and, in some embodiments, insulating. In some embodiments, step 104 includes performing atomic layer deposition (ALD) of a material such as aluminum oxide. In some such embodiments, fast ALD (FALD) is used. The intermediate layer may also be relatively thick. For example, in some embodiments, the thickness of the intermediate layer is approximately 1300 Angstroms.

A hard mask layer is provided on the intermediate layer, via step 106. The hard mask layer has a top surface substantially perpendicular to the ABS. Thus, the topology of the top of the hard mask is substantially flat even though the hard mask is above the first region, the second region, and the bevel of the underlayer. The hard mask layer provided in step 102 is desired to be removable using a different process than the intermediate layer. For example, materials such as Cr may be used for the hard mask layer when the intermediate layer is aluminum oxide. The hard mask layer is also desired to be thick. For example, the portion of the hard mask layer above the second region of the underlayer may be on the order of 2600 Angstroms thick. Step 106 may be performed in a variety of ways. A portion of the intermediate layer above the first region of the underlayer may be masked before deposition of the hard mask layer. This mask may then be removed, a planarization such as a CMP performed, and the region exposed by the mask refilled. Thus, a flat top surface of the hard mask may be formed. In other embodiments, the hard mask layer deposited and a planarization stop structure may be provided away from the region in which the pole is to be formed. A planarization such as a CMP may then be performed to provide the flat top surface of the hard mask layer. In still other embodiments a self-leveling deposition process might be able to be used. Further, in some embodiments, the hard mask layer may have multiple sublayers. In such embodiments, each sublayer may serve as a hard mask for the layer below. Thus, these sublayers are also removable using different processes. Alternatively, the intermediate layer may be formed of multiple sublayers. In other embodiments, both the intermediate layer and the hard mask layer may include sublayers.

A portion of the hard mask layer and the intermediate layer is removed to provide a trench therein, via step 108. The trench has a bottom surface and sidewalls having multiple sidewall angles. A first angle is between the bottom surface and the intermediate layer. A second angle corresponds to the hard mask layer. Additional angles may also be provided using sublayers in the intermediate and/or hard mask layers. Step 108 may include forming a photoresist mask on a portion of the hard mask layer corresponding to the trench, depositing an additional hard mask layer and removing the photoresist mask. Thus, an aperture corresponding to the trench is formed in the additional hard mask layer. One or more removal processes for the hard mask and intermediate layers may then be used. For example, a reactive ion etch (RIE) having a first etch chemistry may be used for the hard mask layer and a second RIE having a second etch chemistry may be used for the intermediate layer. Alternatively, other processes might be used for removing one or both of the hard mask and intermediate layers. If the intermediate and/or hard mask layer(s) include sublayers, then different removal processes may be used for each sublayer.

A pole is provided, via step 110. At least a portion of the pole is in the trench formed in step 108. The pole having a pole tip proximate to the ABS, a yoke distal from the ABS, and a bottom bevel corresponding to the bevel in the underlayer. At least the yoke includes sidewalls, each of which has multiple sidewall angles corresponding to the angles in the trench. For example, the first angle and the second angle in the trench correspond to first and second angles in the pole. In some embodiments, the second angle is ninety degrees from the bottom surface. In some embodiments, both the yoke and the pole tip include multiple sidewall angles on a sidewall. In other embodiments, pole tip may include only a single sidewall angle. Step 110 may include depositing a seed layer, depositing at least one magnetic pole layer, and planarizing the transducer. The step of planarizing the transducer may include performing a CMP. Step 110 may also include forming a top, or trailing edge, bevel in the pole. Thus, a pole, such as a perpendicular magnetic recording (PMR) pole may be formed.

FIGS. 4A, 4B, 4C are diagrams depicting an exemplary embodiment of a portion of a PMR transducer 150 that may be formed using the method 100. For clarity, FIGS. 4A, 4B, and 4C are not to scale. FIG. 4A depicts the transducer 150 from the ABS (i.e. is an ABS view), while FIG. 4B depicts the transducer 150 from the yoke (i.e. is a yoke view). 4C depicts a top view indicating the ABS and yoke portions of the transducer 150. Thus, an underlayer 152, intermediate layer 154, and hard mask layer 156 are shown. A trench 158 has been formed in the intermediate layer 154 and the hard mask layer 156. A pole 160 has been formed in the trench 158. In the embodiment shown, the entire pole 160 is within the trench 158. However, in other embodiments, a portion of the pole 160 may be outside of the trench 158. The pole 160 includes a ferromagnetic material that may have a high saturation magnetization. In some embodiments, a seed layer (not explicitly shown) also resides in the trench. If the seed layer is magnetic, then the seed layer may be considered part of the pole 160. However, if a nonmagnetic seed layer is used, then the pole 160 is considered separate from the seed layer. As can be seen in FIGS. 4A and 4B, the trench 158 and thus the pole 160 has two sidewall angles and. Although depicted on only one sidewall, in the embodiments shown, both sidewalls have the sidewall angles and. However, the sidewall angles on opposite sides of the pole need not be the same. Further, the sidewall angles and may be different (as is shown) or the same. Finally, the yoke view and ABS view depict the pole 160 has having the same sidewall angles. However, in other embodiments, the yoke of the pole and the pole tip at the ABS may have different sidewall angles. In the embodiment shown, the sidewall angle is ninety degrees from the bottom surface of the pole.

Figure 5B:
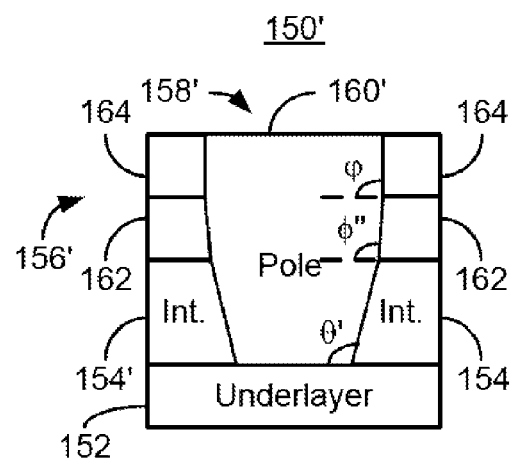

FIGS. 5A-5B are diagrams depicting another exemplary embodiment of a portion of a PMR transducer 150' that may be formed using the method 100. For clarity, FIGS. 5A-5B are not to scale. FIG. 5A depicts the transducer 150' from the ABS, while FIG. 5B depicts the transducer 150' from the yoke. The transducer 150' is analogous to the transducer 150. Because the yoke and pole tip regions of the transducer 150' are analogous to those of the transducer 150, a top view is not shown. Thus, FIGS. 5A and 5B depict an underlayer 152', an intermediate layer 154', a hard mask layer 156', a trench 158' and a pole 160' analogous to the underlayer 152, the intermediate layer 154, the hard mask layer 156, the trench 158 and the pole 160, respectively. Although not shown, a seed layer may be used in forming the pole 160'. In the embodiment shown, the entire pole 160' is within the trench 158'. However, in other embodiments, a portion of the pole 160' may be outside of the trench 158'. As can be seen in FIGS. 5A and 5B, the pole 160' has three sidewall angles, and. Although depicted on only one sidewall, in the embodiments shown, both sidewalls have the sidewall angles, and. Note that the sidewall angles on opposite sides of the pole need not be the same. Further, the sidewall angles, and may be different (as is shown) or the same. Finally, the yoke view and ABS view depict the pole 160 has having the same sidewall angles. However, in other embodiments, the yoke of the pole and the pole tip at the ABS may have different sidewall angles. In the embodiment shown, the sidewall angle is ninety degrees from the bottom surface of the pole. In the embodiment shown, the hard mask 156' has two sublayers 162 and 164, which account for sidewall angles and, respectively. In another embodiment, the intermediate layer 154' might include multiple sublayers. Thus, the number of sidewall angles for the trench 158' and pole 160' may be tailored using the number of sublayers in the intermediate layer 154' and/or the hard mask 156'.

Figure 6A:
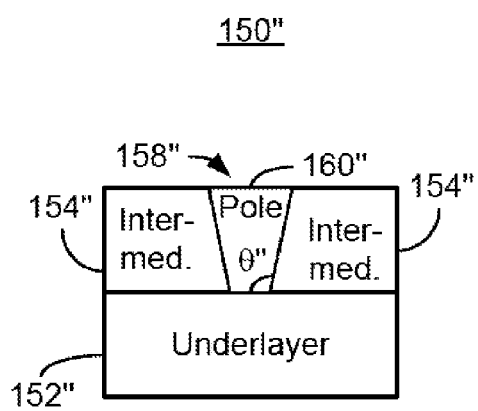
FIGS. 6A and 6B are ABS and yoke views of another exemplary embodiment of a PMR transducer.
Figure 6B:
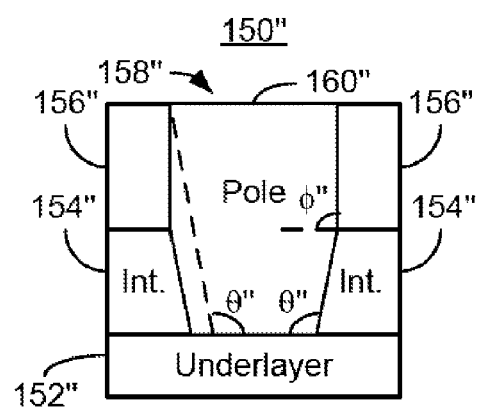

FIGS. 6A-6B are diagrams depicting another exemplary embodiment of a portion of a PMR transducer 150" that may be formed using the method 100. For clarity, FIGS. 6A-6B are not to scale. FIG. 6A depicts the transducer 150" from the ABS, while FIG. 6B depicts the transducer 150' from the yoke. The transducer 150" is analogous to the transducers 150 and 150'. Because the yoke and pole tip regions of the transducer 150" are analogous to those of the transducer 150, a top view is not shown. Thus, FIGS. 6A and 6B depict an underlayer 152", an intermediate layer 154", a hard mask layer 156", a trench 158" and a pole 160" analogous to the underlayer 152/152', the intermediate layer 154/154', the hard mask layer 156/156', the trench 158/158' and the pole 160/160', respectively. Although not shown, a seed layer may be used in forming the pole 160". In the embodiment shown, the entire pole 160" is within the trench 158". However, in other embodiments, a portion of the pole 160" may be outside of the trench 158". As can be seen in FIGS. 6A and 6B, the pole 160" has two sidewall angles and in the yoke region. However, at the ABS, the pole 160" only has a single, bottom sidewall angle. In the embodiment shown in FIGS. 6A and 6B, a trailing edge bevel has also been provided. As a result, the height of the pole 160" at the ABS is less than the height at the yoke. Although depicted on only one sidewall, in the embodiments shown, both sidewalls have the sidewall angles. Note that the sidewall angles on opposite sides of the pole need not be the same. Further, the sidewall angles may be different (as is shown) or the same. Finally, the yoke view and ABS view depict the pole 160" has having the same lower sidewall angles. However, in other embodiments, the yoke of the pole and the pole tip at the ABS may have different lower sidewall angles. In the embodiment shown, the sidewall angle is ninety degrees from the bottom surface of the pole.

Using the method 100, the fabrication of PMR transducers 150, 150', and 150" may be improved. As can be seen in FIGS. 4A, 4B, 4C, 5A, 5B, 6A, and 66C, poles 160, 160' and 160" having multiple sidewall angles at least in the yoke region may be formed. As a result, a greater amount of magnetic material may be provided in the pole 160, 160', and 160" without significantly altering the width of the device. For example, suppose the width of the device at the yoke is set as a design parameter. Multiple sidewall angles at the yoke allow for the pole 160, 160', and/or 160" to contain more magnetic material while maintaining the width. This can be seen in FIG. 6B. the dashed line at angle " shown corresponds to a sidewall for a pole having a single sidewall angle and the same top width as the pole 160". The space between the sidewall of the pole 160" and the dashed line represents the additional magnetic material in the pole 160". This increase in magnetic material translates to a higher field. Further, the track width at the ABS may be maintained. In some embodiments, in which the pole 160 and/or 160' has multiple sidewall angles at the ABS, more magnetic material may be contained at the ABS without increasing the track width. Thus, performance of the pole may be enhanced while maintaining a lower track width.

Figure 7:
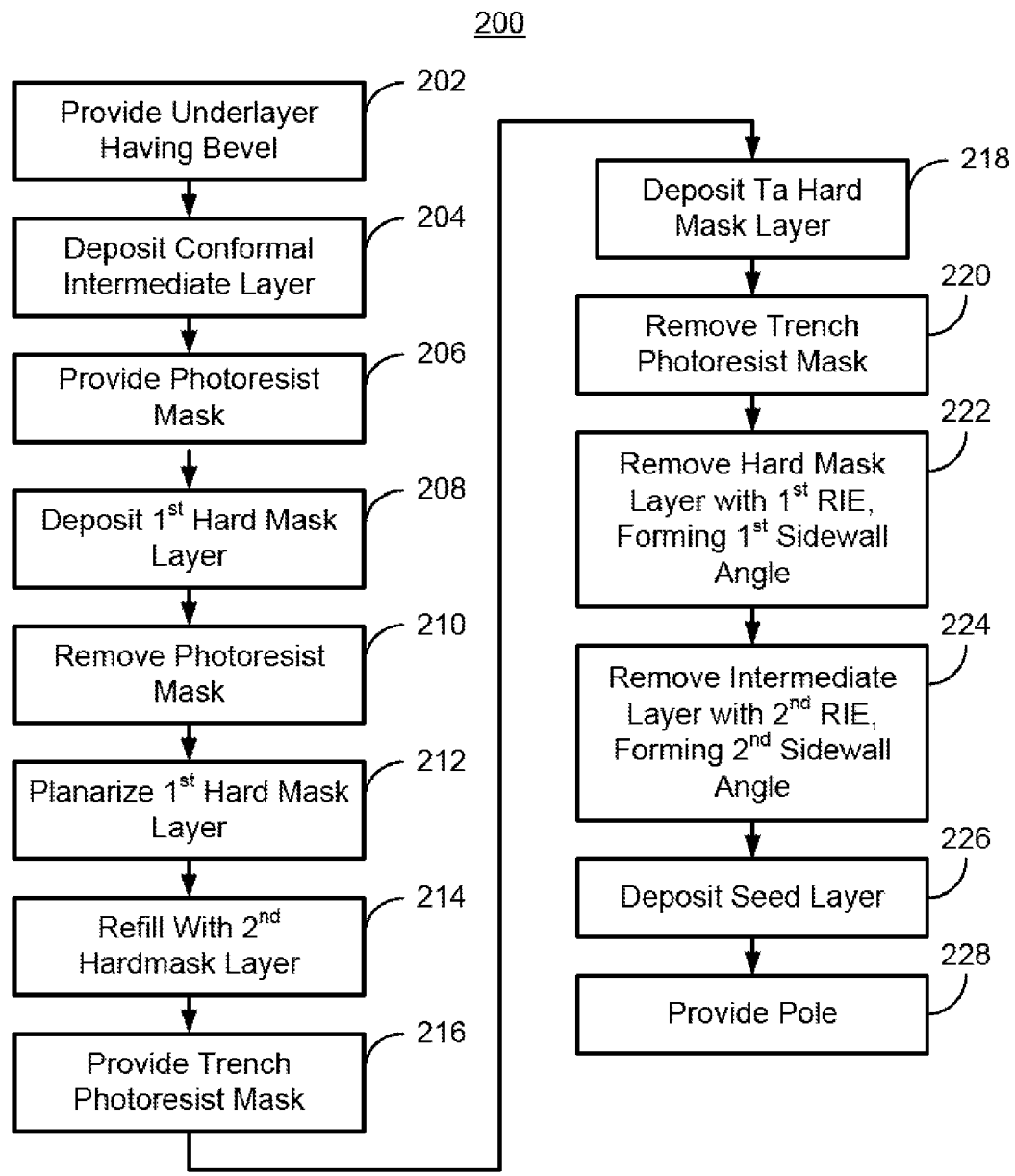
FIG. 7 is a flow chart depicting another exemplary embodiment of a method for fabricating a PMR transducer.

FIG. 7 is a flow chart depicting another exemplary embodiment of a method 200 for fabricating a PMR transducer. For simplicity, some steps may be omitted. FIGS. 8A, 8B, and 8C-17A, 17B, and 17C are diagrams depicting side, ABS, and yoke views of an exemplary embodiment of a portion of a PMR transducer during 250 fabrication. For clarity, FIGS. 8A, 8B, and 8C-17A, 17B, and 17C are not to scale. Because the yoke and pole tip regions of the transducer 250 are analogous to those of the transducers 150/150'/150", a top view is not shown. Referring to FIGS. 7-17C, the method 200 is described in the context of the PMR transducer 250. However, the method 200 may be used to form another device (not shown). The PMR transducer 250 being fabricated may be part of a merged head that also includes a read head (not shown in FIGS. 8A, 8B, and 8C-17A, 17B, and 17C) and resides on a slider (not shown) in a disk drive. The method 200 also may commence after formation of other portions of the PMR transducer 250. The method 200 is also described in the context of providing a single PMR transducer 250. However, the method 200 may be used to fabricate multiple transducers at substantially the same time. The method 200 and device 250 are also described in the context of particular layers. However, in some embodiments, such layers may include multiple sublayers.

An underlayer is provided, via step 202. Step 202 is analogous to step 102 of the method 100. In some embodiments, the underlayer is formed of NiFe. The underlayer has a first portion, a second portion, and a bevel connecting the first portion and the second portion. The first region is thicker than the second region. For example, the first region may be approximately 2600 Angstroms thick, while the second region may be approximately 1300 Angstroms thick. However, other thicknesses may be used. The first region is also between the second region and the ABS. Further, a portion of the first region may occupy the ABS. The bevel is sloped at an angle greater than zero and less than ninety degrees from the ABS. Step 202 may include depositing the underlayer, masking a portion of the underlayer close to the ABS, and milling the exposed portion of the underlayer at a milling angle corresponding to the desired slope. However, in other embodiments, step 202 may be performed in another manner.

Figure 8A:
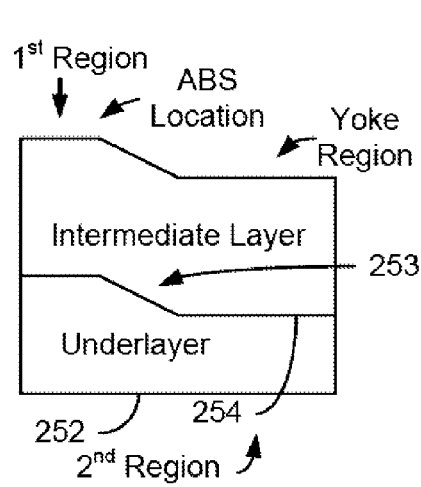
Figure 8B:
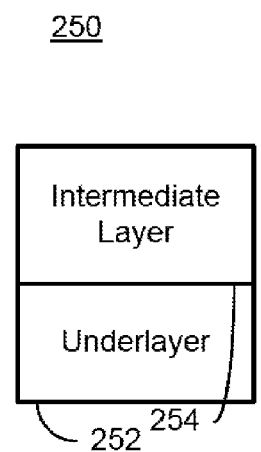
Figure 8C:
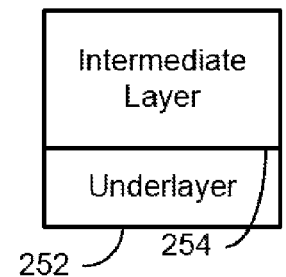

An aluminum oxide intermediate layer is conformally deposited via ALD, via step 204. The intermediate layer is thus substantially conformal with the underlayer. In some embodiments, step 204 includes performing FALD. The intermediate layer may also be relatively thick. For example, in some embodiments, the thickness of the intermediate layer is approximately 1300 Angstroms. FIGS. 8A, 8B, and 8C depict side, ABS, and yoke views, respectively of the transducer 250 after step 204 is performed. Thus, an underlayer 252 and intermediate layer 254 are shown. Also indicated is the bevel 253. The first region, the second region, the ABS location and the yoke region are also indicated in FIG. 8A. The ABS location is the surface at which the ABS is formed. In the embodiment shown, the ABS location is in the first region of the underlayer. However, in other embodiments, the ABS location could be in other areas including but not limited to the bevel 253 and the transition between the first region and the bevel 253.

Steps 206-214 relate to providing a hard mask layer. Thus, steps 206-214 may be seen as one method for performing step 106 of the method 100. A photoresist mask that covers part of the intermediate layer proximate to the ABS is formed, via step 206. Step 206 includes depositing a photoresist layer and patterning the photoresist layer using photolithography. The photoresist mask covers the first region of the underlayer.

Figure 9A:
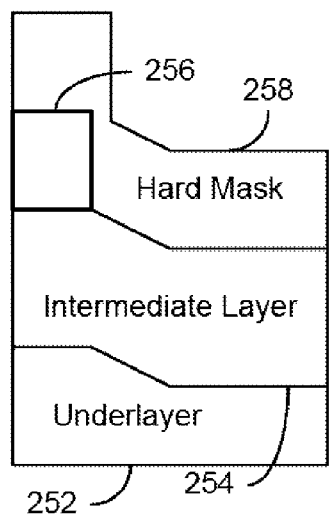
Figure 9B:
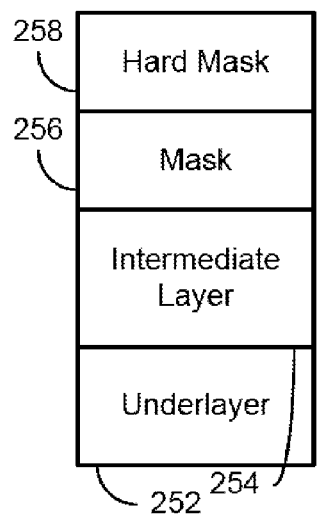
Figure 9C:
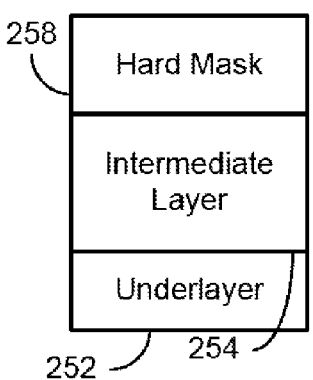

A first hard mask layer is deposited, via step 208. The first hard mask layer may include materials such as Cr. FIGS. 9A, 9B, and 9C depict side, ABS, and yoke views, respectively, of the transducer 250 after step 208 is performed. Photoresist mask 256 and hard mask layer 258 are also shown. The first hard mask layer 258 tracks the underlying topology. Thus, the top surface of the hard mask layer 258 is not yet flat. However, the hard mask layer 258 is not necessarily conformal.

The photoresist mask 256 is removed, via step 210. Step 210 may include stripping the photoresist mask 256. The first hard mask layer 258 is then planarized, via step 258. In some embodiments, step 258 includes performing a CMP.

Figure 10A:
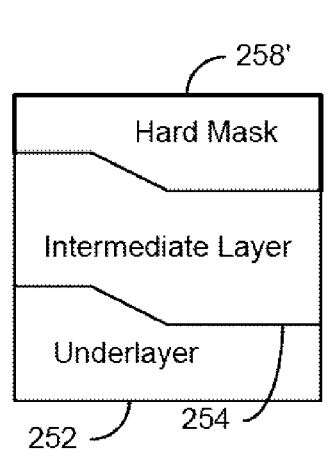
Figure 10B:
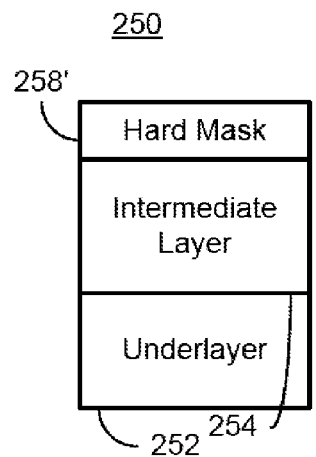
Figure 10C:
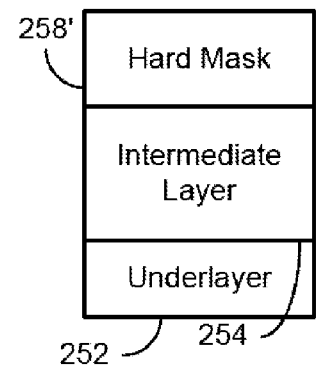

A portion of the magnetic transducer exposed by removal of the photoresist mask in step 210 is refilled with a second hard mask layer, via step 214. The first and second hard mask layers together form a hard mask layer having a top surface perpendicular to the ABS. FIGS. 10A, 10B, and 10C depict side, ABS, and yoke views, respectively, of the transducer 250 after step 214 is performed. The first and second hard mask layers together form hard mask layer 258'. As can be seen in FIGS. 10A, 10B, and 10C, the top surface of the hard mask layer 258' is substantially flat (i.e. perpendicular to the ABS).

Figure 11A:
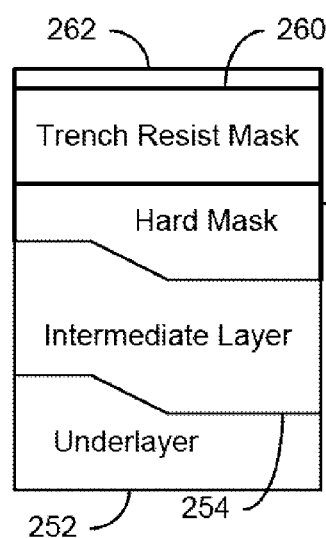
Figure 11B:
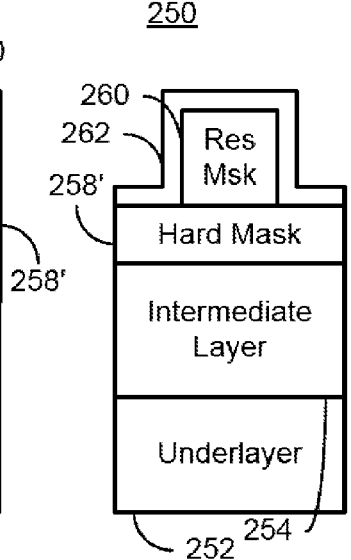
Figure 11C:
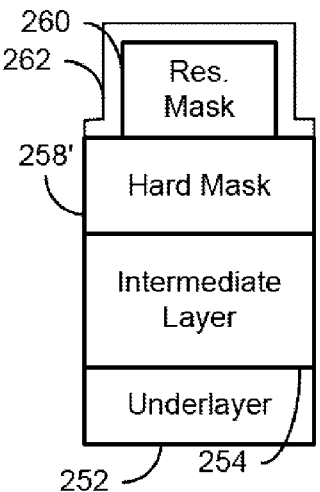

Steps 216-224 are used to form a trench in the hard mask layer 258' and the intermediate layer 254. A trench photoresist mask is provided, via step 216. The trench photoresist mask covers a portion of the hard mask layer 258' corresponding to the trench. Materials other than photoresist might also be used for the trench mask. A Ta hard mask layer is deposited, via step 218. However, in other embodiments, materials other than Ta may be used. FIGS. 11A, 11B, and 11C depict side, ABS, and yoke views, respectively, of the transducer 250 after step 218 is performed. Thus, the trench photoresist mask 260 and Ta hard mask layer 262 are shown. Note that the trench photoresist mask 260 is wider in the yoke region than at the ABS.

Figure 12A:
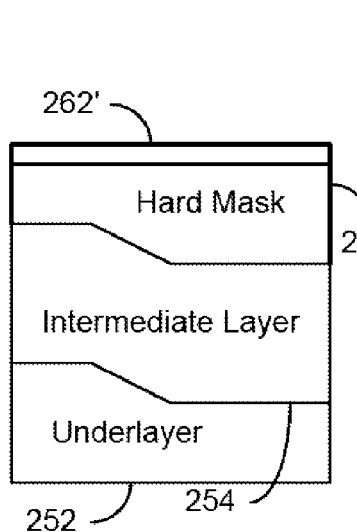
Figure 12B:
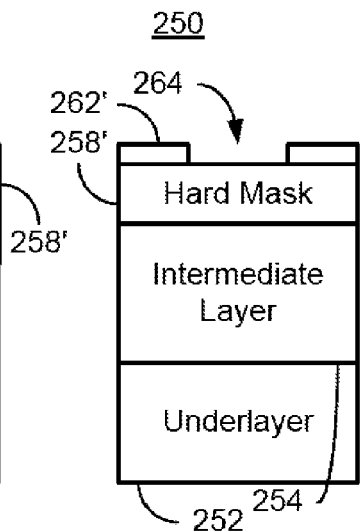
Figure 12C:
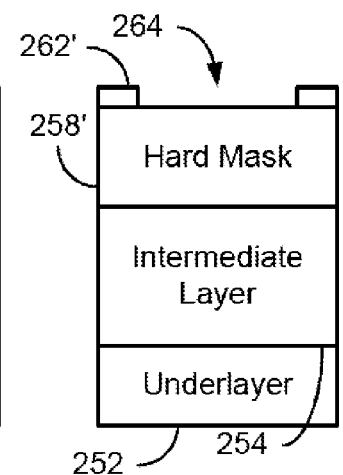

The trench photoresist mask 260 is removed, via step 220. Step 220 may include side milling a portion of the hard mask layer 262, then stripping the underlying trench photoresist mask 260. FIGS. 12A, 12B, and 12C depict side, ABS, and yoke views, respectively, of the transducer 250 after step 220 is performed. Thus, an aperture 264 corresponding to the trench is formed in the Ta hard mask layer 262'. The shape and location of the aperture 264 corresponds to the shape and location of the trench photoresist mask 260 (not shown in FIGS. 12A, 12B, and 12C).

Figure 13A:
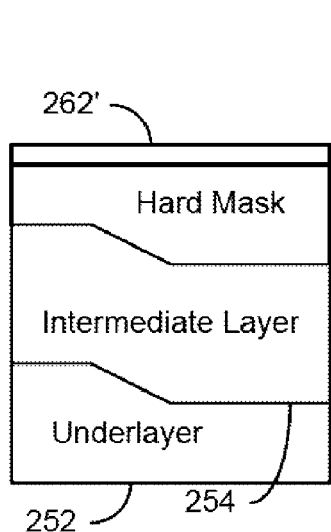
Figure 13B:
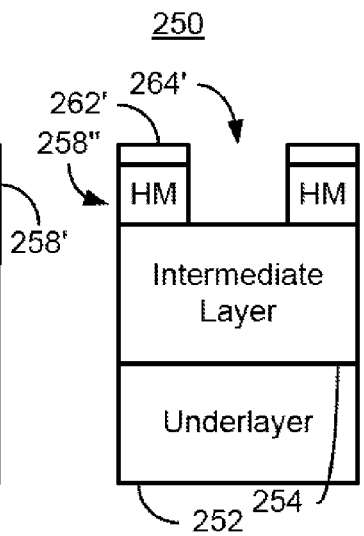
Figure 13C:
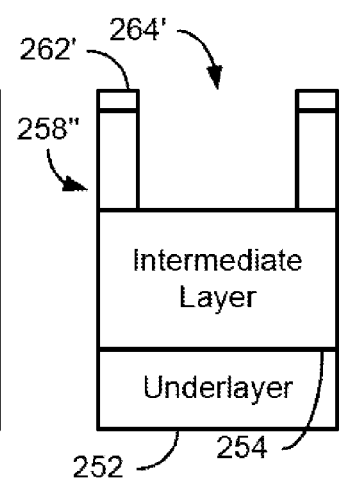

A portion of the hard mask layer 258' and the intermediate layer 254 exposed by the aperture 264 is removed to provide a trench within these layers 254 and 258' using steps 222 and 224. More specifically, a portion of the hard mask layer 258' exposed by the aperture 264 using a first removal process, via step 222. A first RIE having a chemistry appropriate for the material(s) used in the hard mask layer 258' may be used in step 222. FIGS. 13A, 13B, and 13C depict side, ABS, and yoke views, respectively, of the transducer 250 after step 222 is performed. Thus, the aperture 264' extends through the hard mask layer 258". Because the first removal process (e.g. the first RIE) removes the hard mask layer 258', but not the intermediate layer 254, the aperture 264' stops at the intermediate layer 254. Further, in the first sidewall angle is formed by this removal process.

A portion of the intermediate layer 254 exposed by the aperture 264' is removed using a second removal process, via step 224. Step 224 may include using a second RIE appropriate for the aluminum oxide intermediate layer 254. Thus, the profile of the hard mask layer 258" remains substantially unchanged. FIGS. 14A, 14B, and 14C depict side, ABS, and yoke views, respectively, of the transducer 250 after step 224 is performed. Thus, trench 264" has been formed in the layers 254' and 258'. The trench has dual sidewall angles. The first angle, is between the bottom surface/underlayer 252 and the intermediate layer 254'. The second angle, corresponds to the hard mask layer 258" and is substantially ninety degrees from the bottom surface. In other embodiments, other angles could be used. Thus, a trench 264" having a desired location and profile for the pole (not shown) may be formed A seed layer for the pole is deposited, via step 226. The seed layer is for the pole and may be magnetic or nonmagnetic. At least part of the seed layer is in the trench 264". FIGS. 15A, 15B, and 15C depict side, ABS, and yoke views, respectively, of the transducer 250 after step 226 is performed. Thus seed layer 266 is shown. In the embodiment shown, the seed layer 266 is deposited across at least the device region. As a result, a portion of the seed layer resides outside of the trench 264". The remaining empty region of the trench 264" still has multiple sidewall angles and.

Figures 16A, 16B, 16C:
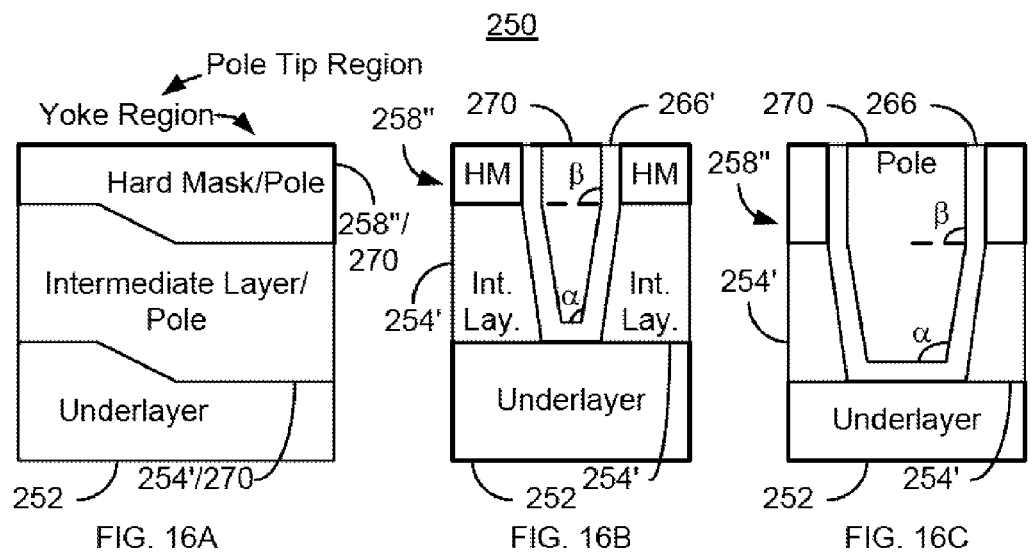
Figures 17A, 17B, 17C:
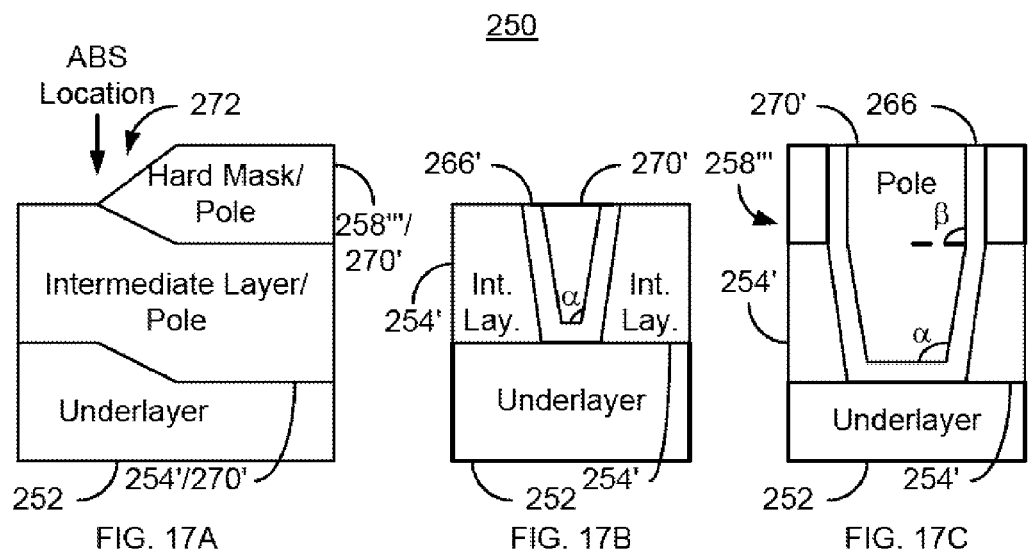

A pole is provided, via step 228. Step 228 includes depositing magnetic material(s) for the pole. As a portion of these materials may reside outside of the pole, step 228 may also include planarizing the transducer 250. FIGS. 16A, 16B, and 16C depict side, ABS, and yoke views, respectively, of the transducer 250 after such a planarization is performed in step 228. Pole 270 has been formed. The pole 270 resides in the regions shown that are occupied by the hard mask layer 258" and intermediate layer 254'. These regions are thus indicated as hard mask/pole 258"/270 and intermediate layer 254'/270 in FIG. 16A. Because a planarization, such as a CMP, has been performed, the pole 270 resides completely within the trench 264" (not explicitly labeled in FIGS. 16A, 16B, and 16C). The pole also has a bottom bevel corresponding to the bevel 253 (not explicitly labeled in FIGS. 16A, 16B, and 16C). Fabrication of the pole 270 may then cease. In other embodiments, a top, or trailing edge, bevel may also be formed in step 228. Formation of a top bevel may include masking a portion of the transducer 250 a specified distance from the ABS and removing the exposed portion of the transducer 250. For example, a directional ion mill may be used. FIGS. 17A, 17B, and 17C depict side, ABS, and yoke views, respectively, after step 228 (including top bevel formation) is performed. Thus, a top bevel 272 has been formed in pole 270'. In the embodiment shown, a top portion of the pole 270' corresponding to part of the hard mask layer 258" has been removed. Thus, the height of the pole 270' at the ABS has been reduced, while the height of the pole 270' at the yoke region is maintained. Further, the height of the pole at the ABS (to be formed at the ABS location) has been reduced enough that the pole tip includes only one sidewall angle '.

The transducer 250 fabricated using the method 200 shares the benefits of the transducers 150, 150', and 150". Multiple sidewall angles, and, at least in the yoke region, may be formed. As a result, a greater amount of magnetic material may be provided in the pole 270/270' without significantly altering the width of the device. Thus, a higher field may be provided at a lower track width. Thus, performance of the pole may be enhanced while maintaining a lower track width.

Figure 18:
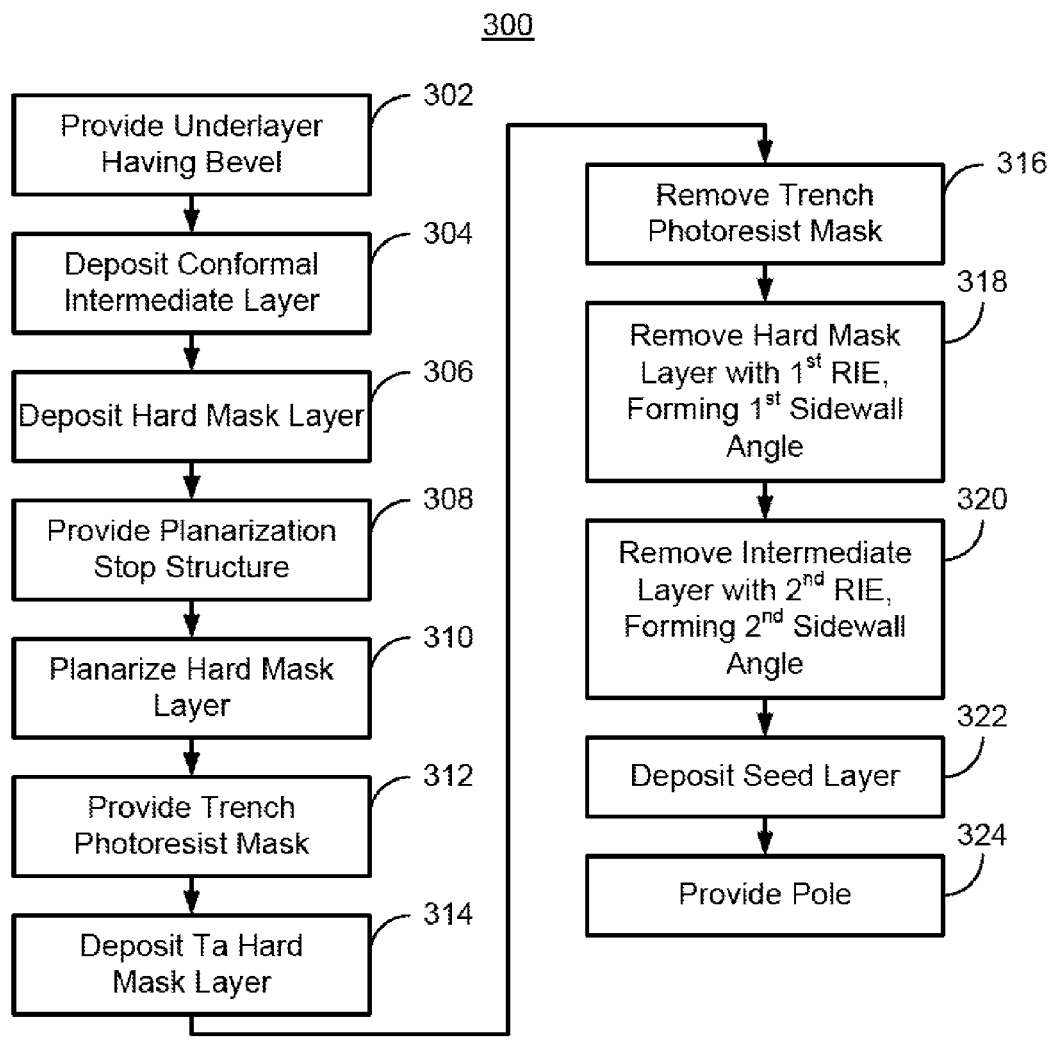
FIG. 18 is a flow chart depicting another exemplary embodiment of a method for fabricating a PMR transducer.

FIG. 18 is a flow chart depicting another exemplary embodiment of a method 300 for fabricating a PMR transducer. For simplicity, some steps may be omitted. FIGS. 19A, 19B, and 19C-28A, 28B, and 28C are diagrams depicting side, ABS, and yoke views of an exemplary embodiment of a portion of a PMR transducer during 350 fabrication. Because the yoke and pole tip regions of the transducer 350 are analogous to those of the transducers 150/150'/150", a top view is not shown. For clarity, FIGS. 19A, 19B, and 19C-28A, 28B, and 28C are not to scale. Referring to FIGS. 18-28C, the method 300 is described in the context of the PMR transducer 350. However, the method 300 may be used to form another device (not shown). The PMR transducer 350 being fabricated may be part of a merged head that also includes a read head (not shown in FIGS. 19A, 19B, and 19C-28A, 28B, and 28C) and resides on a slider (not shown) in a disk drive. The method 300 also may commence after formation of other portions of the PMR transducer 350. The method 300 is also described in the context of providing a single PMR transducer 350. However, the method 300 may be used to fabricate multiple transducers at substantially the same time. The method 300 and device 350 are also described in the context of particular layers. However, in some embodiments, such layers may include multiple sublayers.

An underlayer is provided, via step 302. Step 302 is analogous to steps 102 and 202 of the methods 100 and 200, respectively. Thus, the materials, thicknesses, and processes used may be the same. An aluminum oxide intermediate layer is conformally deposited via ALD, via step 304. Step 304 is analogous to the step 204 of the method 200. The intermediate layer is thus substantially conformal with the underlayer. In some embodiments, step 304 includes performing FALD. The intermediate layer may also be relatively thick. For example, in some embodiments, the thickness of the intermediate layer is approximately 1300 Angstroms. FIGS. 19A, 19B, and 19C depict side, ABS, and yoke views, respectively, of the transducer 350 after step 304 is performed. Thus, an underlayer 552 and intermediate layer 354 are shown. Also indicated is the bevel 353. The first region, the second region, the ABS location and the yoke region are also indicated in FIG. 19A. In the embodiment shown, the ABS location is in the bevel 353 of the underlayer. However, in other embodiments, the ABS location could be in other areas including but not limited to the bevel 353 and the transition between the first region and the bevel 353.

Steps 306-310 relate to providing a hard mask layer. Thus, steps 306-310 may be seen as one method for performing step 106 of the method 100. A hard mask layer is deposited, via step 306. The hard mask layer may include materials such as Cr. FIGS. 20A, 20B, and 20C depict side, ABS, and yoke views, respectively, of the transducer 350 after step 306 is performed. The hard mask layer 358 is also shown. The hard mask layer 358 tracks the underlying topology. Thus, the top surface of the hard mask layer 358 is not yet flat. However, the hard mask layer 358 is not necessarily conformal.

Figure 21A:
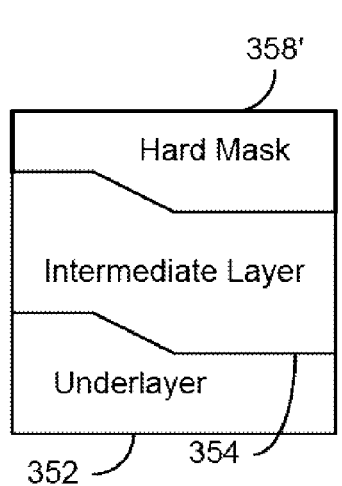
Figure 21B:
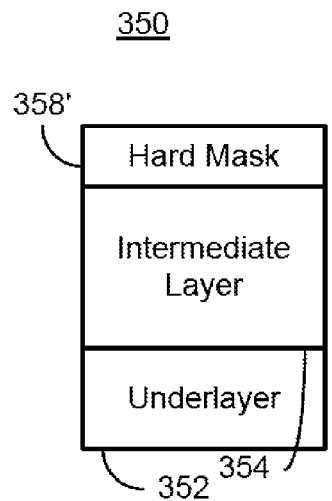
Figure 21C:
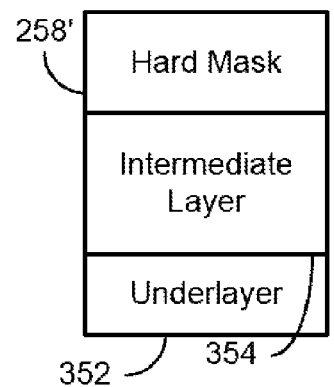

A planarization stop structure is provided on a portion of the transducer distal from the pole location, via step 308. Step 308 may include depositing and patterning an amorphous carbon planarization stop structure far from the ABS. The hard mask layer 358 is then planarized, for example using a CMP, via step 310. FIGS. 21A, 21B, and 21C depict side, ABS, and yoke views, respectively, of the transducer 550 after step 308 is performed. As can be seen in FIGS. 21A, 21B, and 21C, the top surface of the hard mask layer 358' is now substantially flat (i.e. perpendicular to the ABS).

Figure 22A:
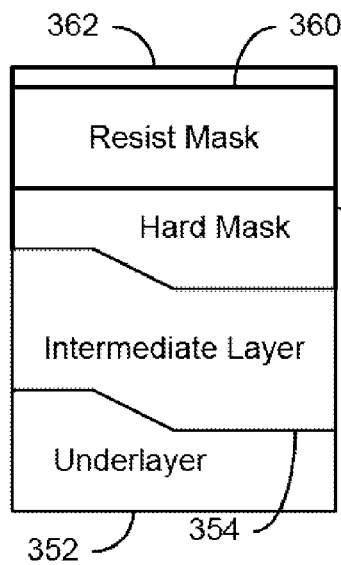
Figure 22B:
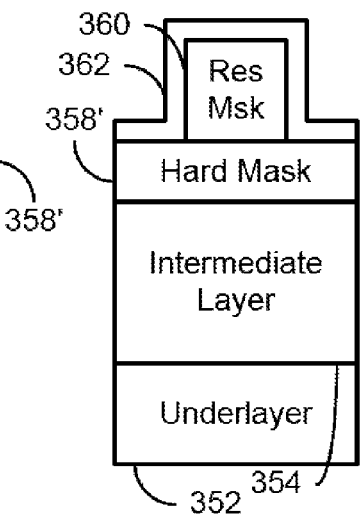
Figure 22C:
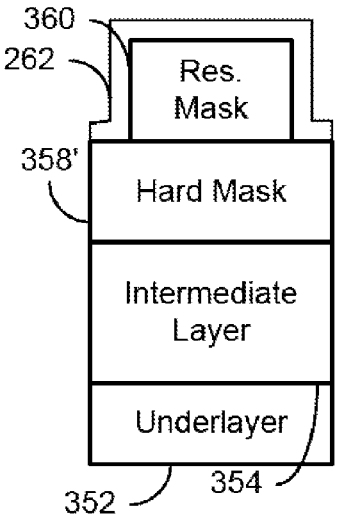

Steps 312-320 are used to form a trench in the hard mask layer 358' and the intermediate layer 354. A trench photoresist mask is provided, via step 312. The trench photoresist mask covers a portion of the hard mask layer 358' corresponding to the trench. A Ta hard mask layer is deposited, via step 314. However, in other embodiments, materials other than Ta may be used. FIGS. 22A, 22B, and 22C depict side, ABS, and yoke views, respectively, of the transducer 350 after step 314 is performed. Thus, the trench photoresist mask 360 and Ta hard mask layer 362 are shown. Note that the trench photoresist mask 360 is wider in the yoke region than at the ABS.

Figures 23A, 23B, 23C:
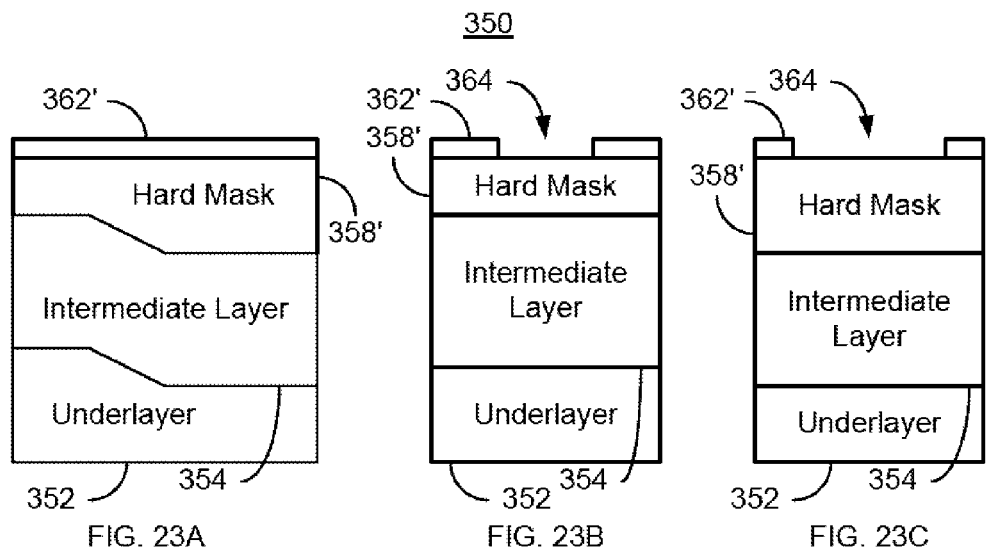

The trench photoresist mask 360 is removed, via step 316. Step 316 may include side milling a portion of the Ta hard mask layer 362, then stripping the underlying trench photoresist mask 360. FIGS. 23A, 23B, and 23C depict side, ABS, and yoke views, respectively, of the transducer 350 after step 316 is performed. Thus, an aperture 362 corresponding to the trench is formed in the Ta hard mask layer. The shape and location of the aperture 364 corresponds to the shape and location of the trench photoresist mask 360 (not shown in FIGS. 23A, 23B, and 23C).

Figures 24A, 24B, 24C:
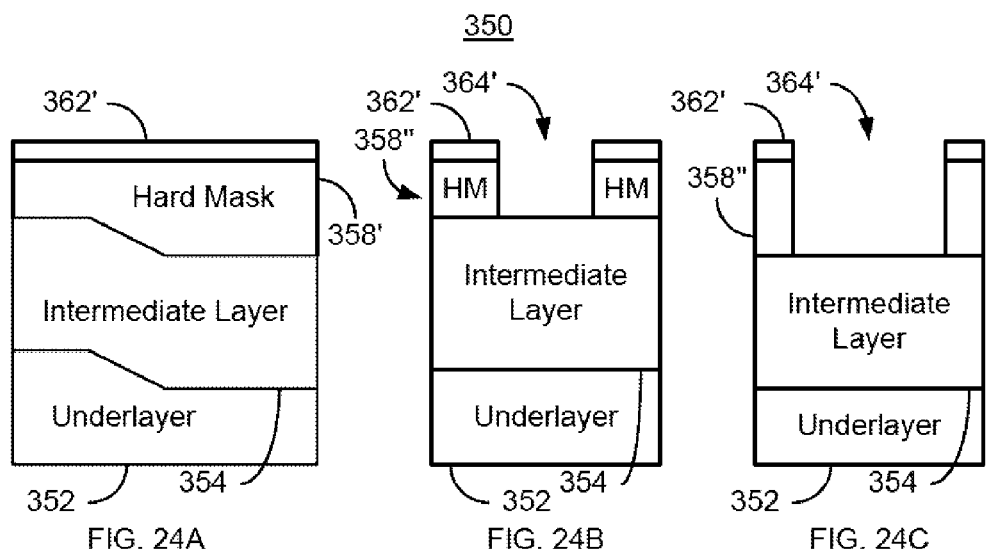

A portion of the hard mask layer 358' and the intermediate layer 354 exposed by the aperture 364 is removed to provide a trench within these layers 354 and 358' using steps 318 and 320. More specifically, a portion of the hard mask layer 358' exposed by the aperture 364 using a first removal process, via step 318. A first RIE having a chemistry appropriate for the material(s) used in the hard mask layer 358' may be used in step 318. FIGS. 24A, 24B, and 24C depict side, ABS, and yoke views, respectively, of the transducer 350 after step 318 is performed. Thus, the aperture 364' extends through the hard mask layer 358". Because the first removal process (e.g. the first RIE) removes the hard mask layer 358', but not the intermediate layer 354, the aperture 364' stops at the intermediate layer 354. Further, in the first sidewall angle is formed by this removal process.

Figures 25A, 25B, 25C:
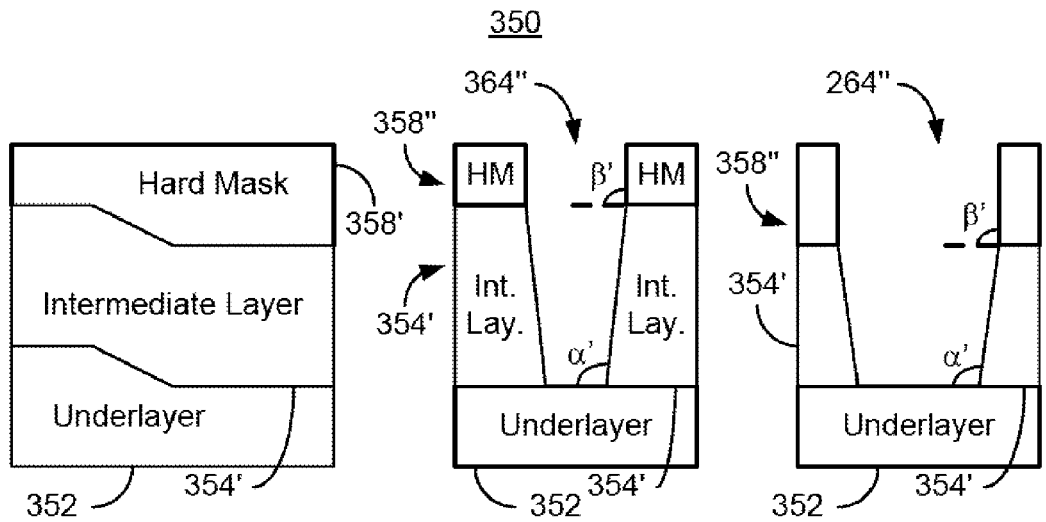
Figures 26A, 26B, 26C:
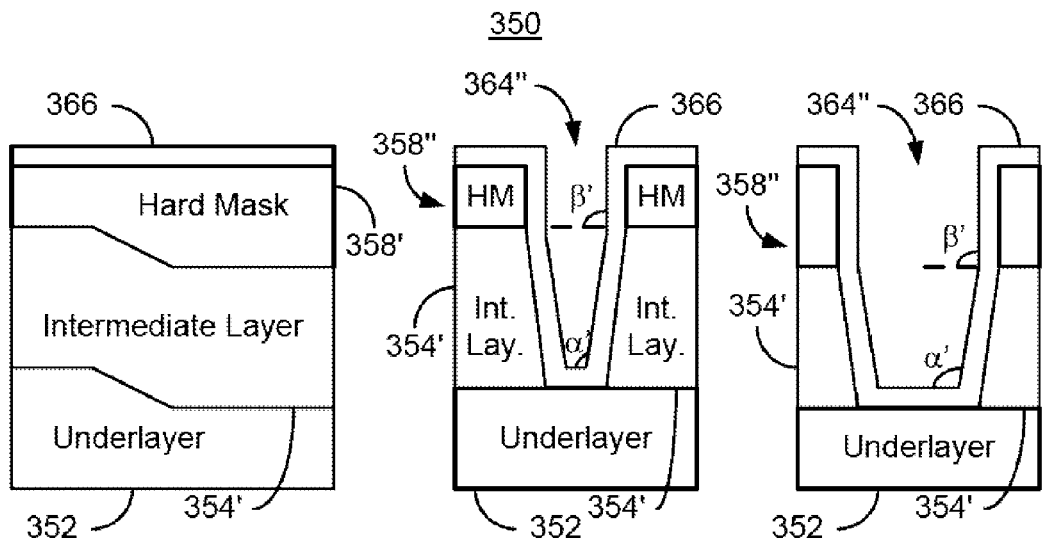

A portion of the intermediate layer 354 exposed by the aperture 364' is removed using a second removal process, via step 320. Step 320 may include using a second RIE appropriate for the aluminum oxide intermediate layer 354. Thus, the profile of the hard mask layer 358" remains substantially unchanged. FIGS. 25A, 25B, and 25C depict side, ABS, and yoke views, respectively, of the transducer 350 after step 320 is performed. Thus, trench 364" has been formed in the layers 354' and 358'. The trench has dual sidewall angles. The first angle, ', is between the bottom surface/underlayer 352 and the intermediate layer 354'. The second angle, ', corresponds to the hard mask layer 358" and is substantially ninety degrees from the bottom surface. In other embodiments, other angles could be used. Thus, a trench 364" having a desired location and profile for the pole (not shown) may be formed A seed layer for the pole is deposited, via step 322. The seed layer is for the pole and may be magnetic or nonmagnetic. At least part of the seed layer is in the trench 364". FIGS. 26A, 26B, and 26C depict side, ABS, and yoke views, respectively, of the transducer 350 after step 322 is performed. Thus seed layer 366 is shown. In the embodiment shown, the seed layer 366 is deposited across at least the device region. As a result, a portion of the seed layer resides outside of the trench 364". The remaining empty region of the trench 364" still has multiple sidewall angles ' and '.

Figure 27A:
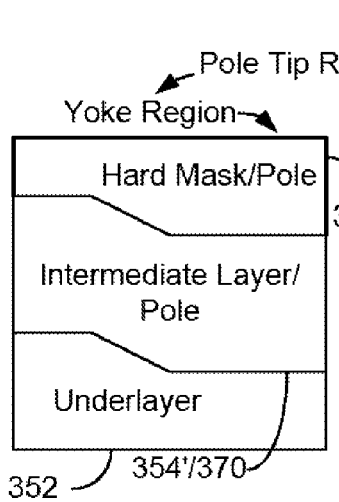
Figure 27B:
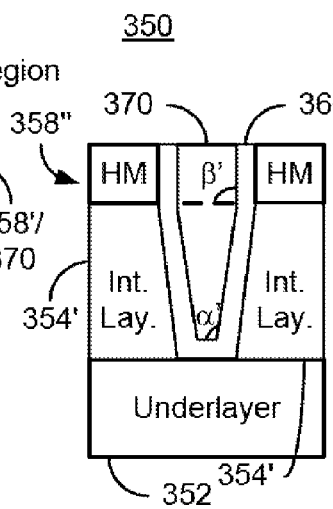
Figure 27C:
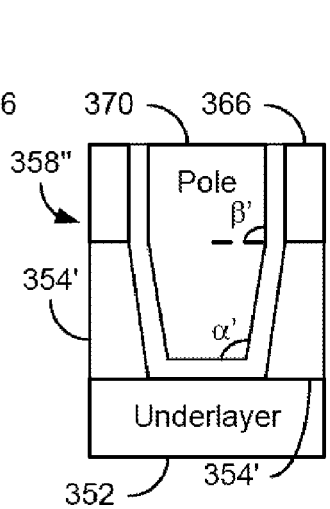
Figure 28A:
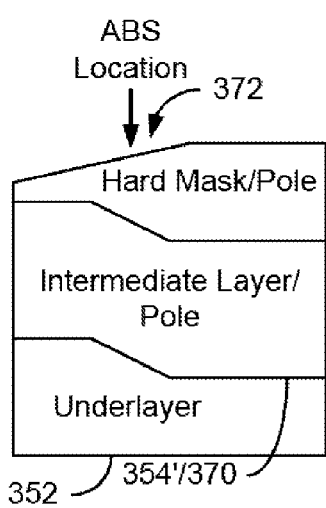
Figure 28B:
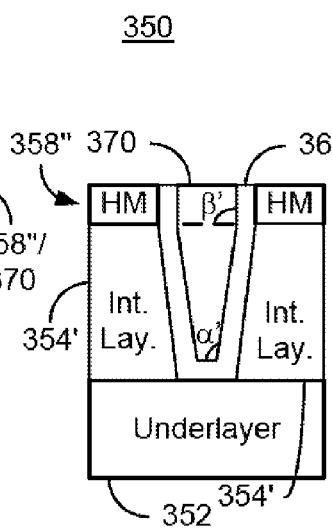
Figure 28C:
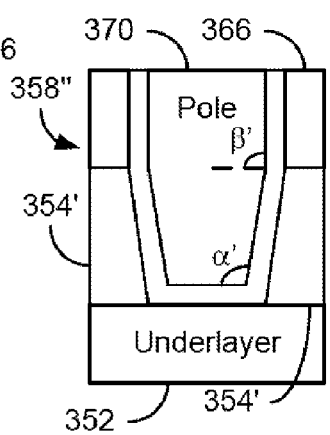

A pole is provided, via step 324. Step 324 includes depositing magnetic material(s) for the pole. As a portion of these materials may reside outside of the pole, step 324 may also include planarizing the transducer 350. FIGS. 27A, 27B, and 26C depict side, ABS, and yoke views, respectively, of the transducer 350 after such a planarization is performed in step 324. Pole 370 has been formed. The pole 370 resides in the trench in the regions shown that are occupied by the hard mask layer 358" and intermediate layer 354'. These regions are thus indicated as hard mask/pole 258"/270 and intermediate layer 254'/270 in FIG. 27A. Because a CMP has been performed, the pole 370 resides completely within the trench 364" (not explicitly labeled in FIGS. 27A, 27B, and 27C). The pole also has a bottom bevel corresponding to the bevel 353 (not explicitly labeled in FIGS. 27A, 27B, and 27C). A top, or trailing edge, bevel may also be formed in step 324. Formation of a top bevel may include masking a portion of the transducer 350 a specified distance from the ABS and removing the exposed portion of the transducer 350. For example, a directional ion mill may be used. FIGS. 28A, 28B, and 28C depict side, ABS, and yoke views, respectively, after step 324 (including top bevel formation) is performed. Thus, a top bevel 372 has been formed in pole 370'. In the embodiment shown, a top portion of the pole 370' corresponding to part of the hard mask layer 358" has been removed. Thus, the height of the pole 370' at the ABS has been reduced, while the height of the pole 370' at the yoke region is maintained. Further, even at the ABS (to be formed at the ABS location), the pole tip includes both sidewall angles ' and '.

The transducer 350 fabricated using the method 300 shares the benefits of the transducers 150, 150', 150", and 250. Multiple sidewall angles, ' and ', may be formed. As a result, a greater amount of magnetic material may be provided in the pole 370/370' without significantly altering the width of the device. Thus, a higher field may be provided at a lower track width. Thus, performance of the pole may be enhanced while maintaining a lower track width.

What is claimed is:

1. A method for fabricating a pole in a magnetic transducer having air-bearing surface (ABS), the method comprising:
   providing an underlayer having a first region, a second region, and a bevel connecting the first region and the second region, the first region having a first thickness and being proximate to the ABS, the second region having a second thickness less than the first thickness and being distal from the ABS;
   depositing an intermediate layer, the intermediate layer being substantially conformal with the underlayer;
   providing a hard mask layer on the intermediate layer, the hard mask layer having a top surface substantially perpendicular to the ABS;
   removing a portion of the hard mask layer and the intermediate layer to provide a trench therein, the trench having a bottom surface and sidewalls having a first angle and a second angle, the first angle being between the bottom surface and the intermediate layer, the second angle corresponding to the hard mask layer;
   providing a pole, at least a portion of the pole residing in the trench, the pole having a pole tip proximate to the ABS, a yoke distal from the ABS, and a bottom bevel corresponding to the bevel in the underlayer, at least the yoke including a plurality of sidewalls having a plurality of sidewall angles corresponding to the first angle and the second angle.

2. The method of claim 1 wherein the second angle is ninety degrees from the bottom surface.

3. The method of claim 1 wherein the step of providing the intermediate layer further includes:
   performing atomic layer deposition of aluminum oxide.

4. The method of claim 1 wherein the step of providing the hard mask layer further includes:
   providing a photoresist mask covering a portion of the intermediate layer proximate to the ABS;
   depositing a first hard mask layer;
   removing the photoresist mask;
   planarizing the first hard mask layer;
   refilling a portion of the magnetic transducer with a second hard mask layer, the portion of the magnetic transducer being exposed by removing the photoresist mask, the second hard mask layer and the first hard mask layer forming the hard mask layer.

5. The method of claim 1 wherein the step of providing the hard mask layer further includes:
   depositing the hard mask layer;
   providing a planarization stop structure distal from the pole tip;
   planarizing the hard mask layer.

6. The method of claim 1 wherein the step of forming the trench further includes:
   providing a photoresist mask covering a portion of the hard mask layer corresponding to the trench;
   depositing an additional hard mask layer; and
   removing the photoresist mask, forming an aperture in the additional hard mask layer, the aperture corresponding to the trench.

7. The method of claim 6 wherein the step of forming the trench further includes:
   performing a first etch corresponding to the hard mask layer, a portion of the hard mask layer exposed by the aperture being removed and forming a first portion of the trench; and
   performing a second etch different from the first etch, the second etch corresponding to the intermediate layer and forming a second portion of the trench.

8. The method of claim 7 wherein the first etch is a first RIE and the second etch is a second RIE.

9. The method of claim 1 wherein the hard mask layer further includes Cr.

10. The method of claim 1 wherein the step of providing the pole further includes:
    depositing a seed layer, a portion of the seed layer residing in the trench;
    depositing at least one magnetic pole layer, at least a portion of the at least one magnetic pole layer residing in the trench; and
    planarizing the transducer.

11. The method of claim 10 wherein the step of planarizing the transducer further includes:
    chemical mechanical planarizing (CMP) the transducer.

12. The method of claim 1 wherein the pole is a perpendicular magnetic recording write pole.

13. The method of claim 1 wherein the sidewalls for the trench further includes a third angle, and wherein the plurality of sidewall angles includes the third sidewall angle.

14. The method of claim 1 wherein the yoke and the pole tip include the first angle and the second angle.

15. The method of claim 1 wherein a portion pole tip at the ABS includes only the first angle.

16. The method of claim 1 wherein the step of providing the pole further includes:
    forming a trailing edge bevel.

17. A method for fabricating a magnetic recording transducer having an air-bearing surface (ABS), the method comprising:
    providing an underlayer having a first portion, a second portion, and a bevel connecting the first portion and the second portion, the first portion having a first thickness and being proximate to the ABS, the second portion having a second thickness less than the first thickness and being distal from the ABS, and a bevel connecting the first thickness and the second thickness;

atomic layer depositing an intermediate layer, the intermediate layer being substantially conformal with the underlayer and including aluminum oxide;

providing a photoresist mask covering a portion of the intermediate layer proximate to the ABS;

depositing a first hard mask layer;

removing the photoresist mask;

planarizing the first hard mask layer;

refilling a portion of the magnetic transducer with a second hard mask layer, the portion of the magnetic transducer being exposed by removing the photoresist mask, the second hard mask layer and the first hard mask layer forming a hard mask layer including Cr and having a top surface substantially perpendicular to the ABS;

providing a trench photoresist mask covering a portion of the hard mask layer corresponding to the trench;

depositing a Ta hard mask layer;

removing the trench photoresist mask, forming an aperture in the Ta hard mask layer corresponding to the trench;

removing a portion of the hard mask layer and the intermediate layer exposed by the aperture to provide a trench therein, the trench having a bottom surface and sidewalls having a first angle and a second angle, the first angle being between the bottom surface and the intermediate layer, the second angle corresponding to the hard mask layer and being substantially ninety degrees from the bottom surface, the step of removing the portion of the hard mask layer and the intermediate layer further including performing a first reactive ion etch (RIE) for removing a portion of the hard mask layer and corresponding to the second angle; and performing a second RIE for removing a portion of the intermediate layer and corresponding to the first angle, the second RIE being different from the first RIE;

depositing a seed layer, at least a portion of the seed layer residing in the trench; and providing a pole, at least a portion of the pole residing in the trench, the pole having a pole tip proximate to the ABS, a yoke distal from the ABS, and a bottom bevel corresponding to the bevel in the underlayer, at least the yoke of the pole including a plurality of sidewalls having a plurality of sidewall angles corresponding to the first angle and the second angle.

18. A method for fabricating a magnetic recording transducer having an air-bearing surface (ABS), the method comprising:

providing an underlayer having a first portion, a second portion, and a bevel connecting the first portion and the second portion, the first portion having a first thickness and being proximate to the ABS, the second portion having a second thickness less than the first thickness and being distal from the ABS, and a bevel connecting the first thickness and the second thickness;

atomic layer depositing an intermediate layer, the intermediate layer being substantially conformal with the underlayer and including aluminum oxide;

depositing a hard mask layer;

providing a planarization stop structure on a portion of the transducer;

planarizing the hard mask layer such that the hard mask layer has a top surface substantially perpendicular to the ABS;

providing a trench photoresist mask covering a portion of the hard mask layer corresponding to the trench;

depositing a Ta hard mask layer;

removing the trench photoresist mask, forming an aperture in the Ta hard mask layer corresponding to the trench;

removing a portion of the hard mask layer and the intermediate layer exposed by the aperture to provide a trench therein, the trench having a bottom surface and sidewalls having a first angle and a second angle, the first angle being between the bottom surface and the intermediate layer, the second angle corresponding to the hard mask layer and being substantially ninety degrees from the bottom surface, the step of removing the portion of the hard mask layer and the intermediate layer further including performing a first reactive ion etch (RIE) for removing a portion of the hard mask layer and corresponding to the second angle; and performing a second RIE for removing a portion of the intermediate layer and corresponding to the first angle, the second RIE being different from the first RIE;

depositing a seed layer, at least a portion of the seed layer residing in the trench; and providing a pole, at least a portion of the pole residing in the trench, the pole having a pole tip proximate to the ABS, a yoke distal from the ABS, and a bottom bevel corresponding to the bevel in the underlayer, at least the yoke of the pole including a plurality of sidewalls having a plurality of sidewall angles corresponding to the first angle and the second angle.

* * * * *